US009151355B2

(12) United States Patent
    Chen

(10) Patent No.: US 9,151,355 B2
(45) Date of Patent: Oct. 6, 2015

(54) CO-AXIAL ADJUSTABLE DAMPING ASSEMBLY

(71) Applicant: RACINGBROS INTERNATIONAL INCORPORATION, Taichung (TW)

(72) Inventor: Meng-Tsung Chen, Taichung (TW)

(73) Assignee: Racingbros International Incorporated, Taichung (TW)

( * ) Notice: Subject to any disclaimer, the term of this patent is extended or adjusted under 35 U.S.C. 154(b) by 88 days.

(21) Appl. No.: 13/863,515

(22) Filed: Apr. 16, 2013

(65) Prior Publication Data

US 2014/0305756 A1    Oct. 16, 2014

(51) Int. Cl.
    *F16F 9/56*    (2006.01)
    *F16F 9/46*    (2006.01)
(52) U.S. Cl.
    CPC . *F16F 9/56* (2013.01); *F16F 9/462* (2013.01); *F16F 2230/0064* (2013.01)

(58) Field of Classification Search
    CPC ........... F16F 9/062; F16F 9/063; F16F 9/462; F16F 9/56; F16F 9/443; F16F 2230/0064
    USPC ................ 267/64.28; 188/300, 299.1, 319.2, 188/282.6
    See application file for complete search history.

(56) References Cited

U.S. PATENT DOCUMENTS

| 5,969,588 A * | 10/1999 | Nelson .......................... 335/229 |
| 6,042,091 A * | 3/2000 | Marzocchi et al. ......... 267/64.15 |
| 2003/0234144 A1* | 12/2003 | Fox ............................... 188/278 |
| 2004/0211691 A1* | 10/2004 | Winnard ....................... 206/378 |
| 2011/0174582 A1* | 7/2011 | Wootten et al. ............... 188/266 |
| 2013/0105260 A1* | 5/2013 | Chen et al. .................... 188/313 |

* cited by examiner

*Primary Examiner* — Bradley King
(74) *Attorney, Agent, or Firm* — Rosenberg, Klein & Lee

(57) ABSTRACT

A co-axial adjustable damping assembly includes a cylinder unit having an outer case with a cap, and an inner case having a piston unit which movably contacts inside of the outer case. A valve unit extends through the piston unit and is inserted into the inner case. A piston is connected to the valve unit and defines a first oil chamber and a second oil chamber in the inner case. A path communicates between the first and second oil chambers. A piston rod extends through the inner case, the outer case, the piston unit and the piston. A switching device is connected to the cap and has a first tube which has a cam part contacting the piston rod. A damping device has a driving rod inserted into the first tube. The driving rod is rotated to move the piston rod linearly to adjust the path.

13 Claims, 18 Drawing Sheets

CO-AXIAL ADJUSTABLE DAMPING ASSEMBLY

FIELD OF THE INVENTION

The present invention relates to a damping assembly, and more particularly, to damping assembly using air or hydraulic oil and the damping value can be adjusted by changing the volume of the hydraulic oil.

BACKGROUND OF THE INVENTION

The conventional damping assembly is generally used in vehicles or machines and provides velocity-reduction and buffering features. The conventional damping assemblies are generally cataloged by mechanical damping assembly, hydraulic damping assembly and hybrid damping assembly which uses both air and hydraulic oil. The mechanical damping assembly absorbs shocks and vibration by operation to the mechanism to provide the velocity-reduction and buffering features. The hydraulic damping assembly uses hydraulic related parts and hydraulic oil is filled in the assembly so as to absorb the shocks and vibrations. The hybrid damping assembly uses both hydraulic oil and air related parts, hydraulic oil and air are filled in the assembly so as to absorb the shocks and vibrations.

The hydraulic damping assembly and the hybrid damping assembly are able to adjust the velocity that the piston or the like moves back and forth. The purpose is made by adjusting the volume of the hydraulic oil or air. When a large amount of the hydraulic oil or air can pass within a certain period of time, this means that the piston moves fast, this means that the piston moves fast and less damping force is generated. On the contrary, when a smaller amount of the hydraulic oil or air can pass within a certain period of time, this means that the piston moves slower and larger damping force is generated. When zero of the amount of the hydraulic oil or air can pass, this means the damping assembly is locked and no buffering feature is provided.

Taiwan Patent Application No. 094136871 discloses a valve driving unit which is connected to the valve assembly, and the rider can operate the valve assembly between two positions so as to set the suspension system with two different features. A adjustment assembly is connected to the valve driving unit so as to adjust the damping features of the other position of the valve driving unit.

Taiwan Patent Application No. 093219269 discloses a hydraulic unit which has an installation unit connected to the open end of the outer tube of the hydraulic unit, and a ring is movably connected to the installation end of the hydraulic unit and the ring is located in the sleeve of a pneumatic unit. The installation unit has an axle extending through the center thereof and a cone-shaped member is inserted in the axle. The installation unit is connected with a frame on the other end thereof and a collar is mounted to the frame. A cover is connected between the frame and the installation unit. A piston is connected to the installation unit which is located at the front end of the frame. A seal cover is connected to the front end of the installation unit. A pneumatic unit has a sleeve which has one end thereof mounted to the hydraulic unit, and the other end of the sleeve is connected to an adjustment portion. A chamber is defined in the sleeve. The adjustment portion has a cover to be secured to the pneumatic unit and an adjustment rod is connected in the cover. The adjustment rod is in contact with the cone-shaped member so as to provide a simple adjustment function.

Both of the two prior arts are able to adjust the damping force and use cone-shaped rod to control the overlapped area of the valve rod matched with the inclined portion to change the space in the path. By this way, the volume of the hydraulic oil passing through the path can be controlled. On the other hand, the two prior arts are provided with locking function which is set by rotating the cone-shaped rod to its extreme position to fully match the valve rod with the cone-shaped rod along the inclined portion so as to close the path and the volume of the hydraulic oil passing through the path is reduced to zero. There will be no suspension feature is provided.

However, both of the two prior arts cannot quickly lock the path, it takes time, at least three seconds, to rotate the cone-shaped rod and which is not quick enough. Besides, the adjustment mechanism and the locking mechanism are combined as a one piece and the linear movement of the valve rod is made by the engagement with the cone-shaped portion. There is only one path is adjusted so that the range for the control of the hydraulic volume is limited.

The present invention intends to provide a co-axial adjustable damping assembly which improves the shortcomings mentioned above.

SUMMARY OF THE INVENTION

The present invention relates to a co-axial adjustable damping assembly and comprises a cylinder unit having an outer case and an inner case which is movably inserted into the outer case. A cap is connected to the outer case and a piston unit is connected to one end of the inner case. The piston unit is movably in contact with inside of the outer case. A valve unit extends through the piston unit and is inserted into the inner case. A piston is connected to the valve unit and defines a first oil chamber and a second oil chamber in the inner case. A path communicates between the first and second oil chambers. A piston rod extends through the inner case, the outer case, the piston unit and the piston. A switching device is connected to the cap and has a first tube which is rotatably located in the cap. A lever is connected to one end of the first tube and located outside of the cap. A cam part is formed on the outside of the first tube and contacts the piston rod to linearly move the piston rod to seal and open the path. A damping device has a first damping unit which has a driving rod co-axially inserted into the first tube and partially exposed from the cap. The driving rod has a notch located corresponding to the piston rod. A ball contacts the notch and the piston rod. A knob is connected to the exposed end of the driving rod and partially and co-axially engaged within the lever. The knob and the driving rod are simultaneously rotated to move the piston rod linearly so as to adjust the path at a first position.

The primary object of the present invention is to provide a co-axial adjustable damping assembly which has a switching device and the switching device is operated by operation to the lever to quickly activate or lock the damping assembly.

Another object of the present invention is to provide a co-axial adjustable damping assembly wherein the cylinder unit is co-axially connected to the switching device, and cooperated with the cam part so that when the knob is rotated one revolution, all of the adjustments stages are completed. The travel of the piston rod is short and the damping assembly is reacted quickly and sensitively.

Yet another object of the present invention is to provide a co-axial adjustable damping assembly wherein the damping device includes two damping units which allow large amount hydraulic oil to be operated to control the two respective velocitys of compression and extension of the cylinder unit.

A further object of the present invention is to provide a co-axial adjustable damping assembly which allows the user to switch or adjust the damping assembly at the same position without moving the hand.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
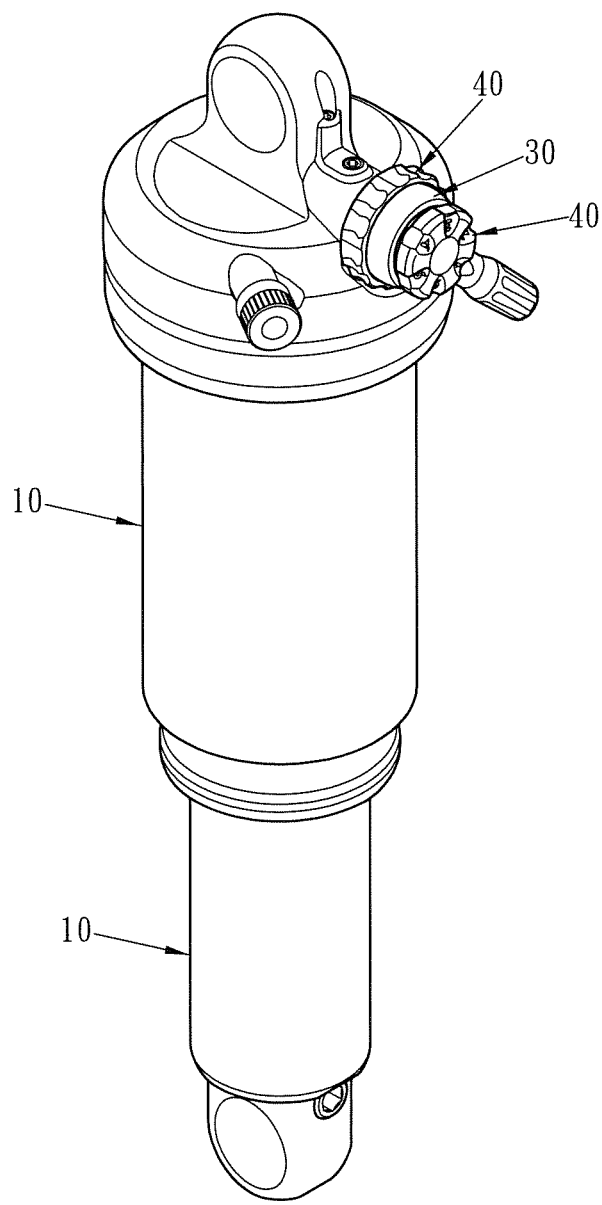
FIG. 1 is a perspective view to show the co-axial adjustable damping assembly of the present invention.
Figure 2:
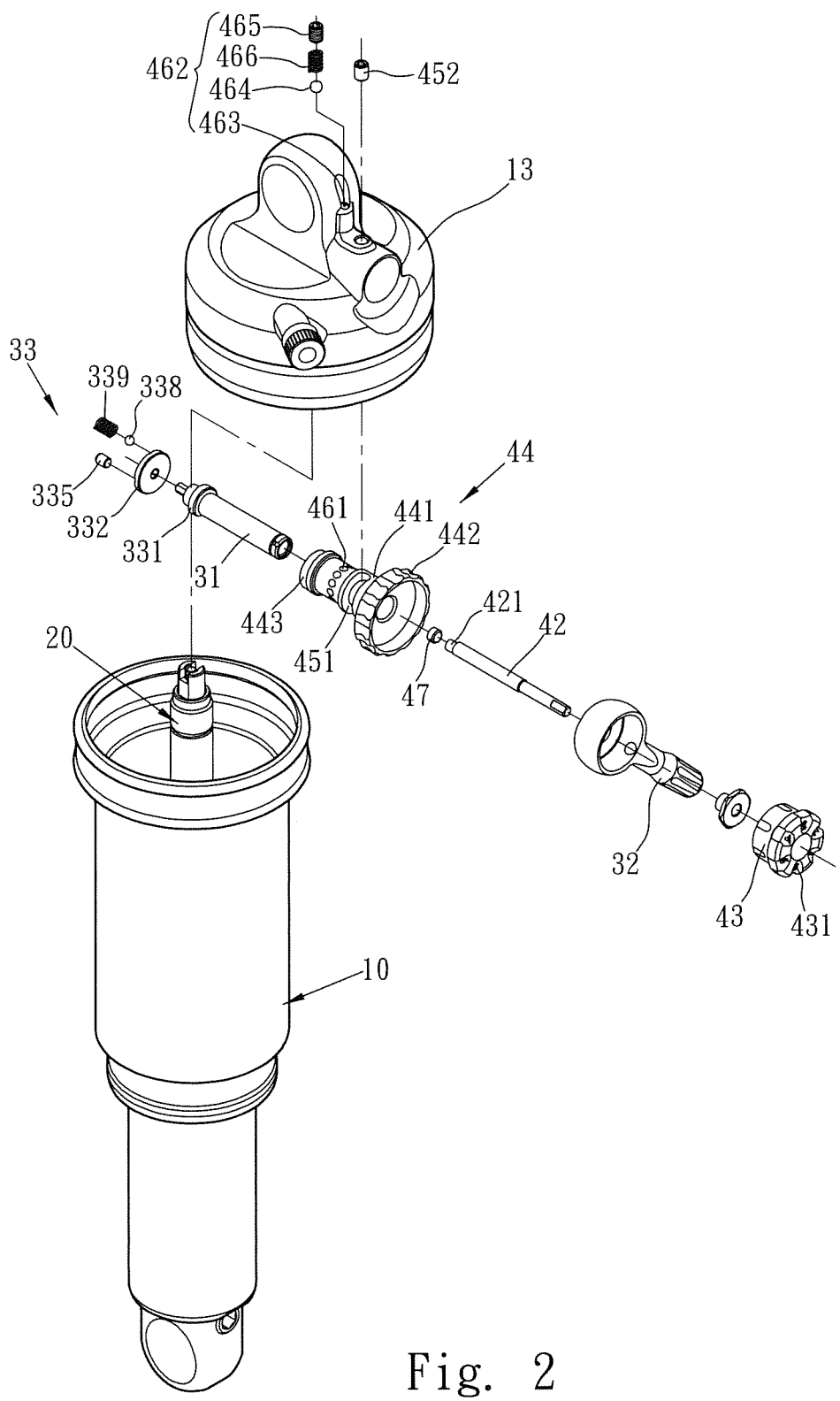
FIG. 2 is an exploded view to show the co-axial adjustable damping assembly of the present invention.
Figure 3:
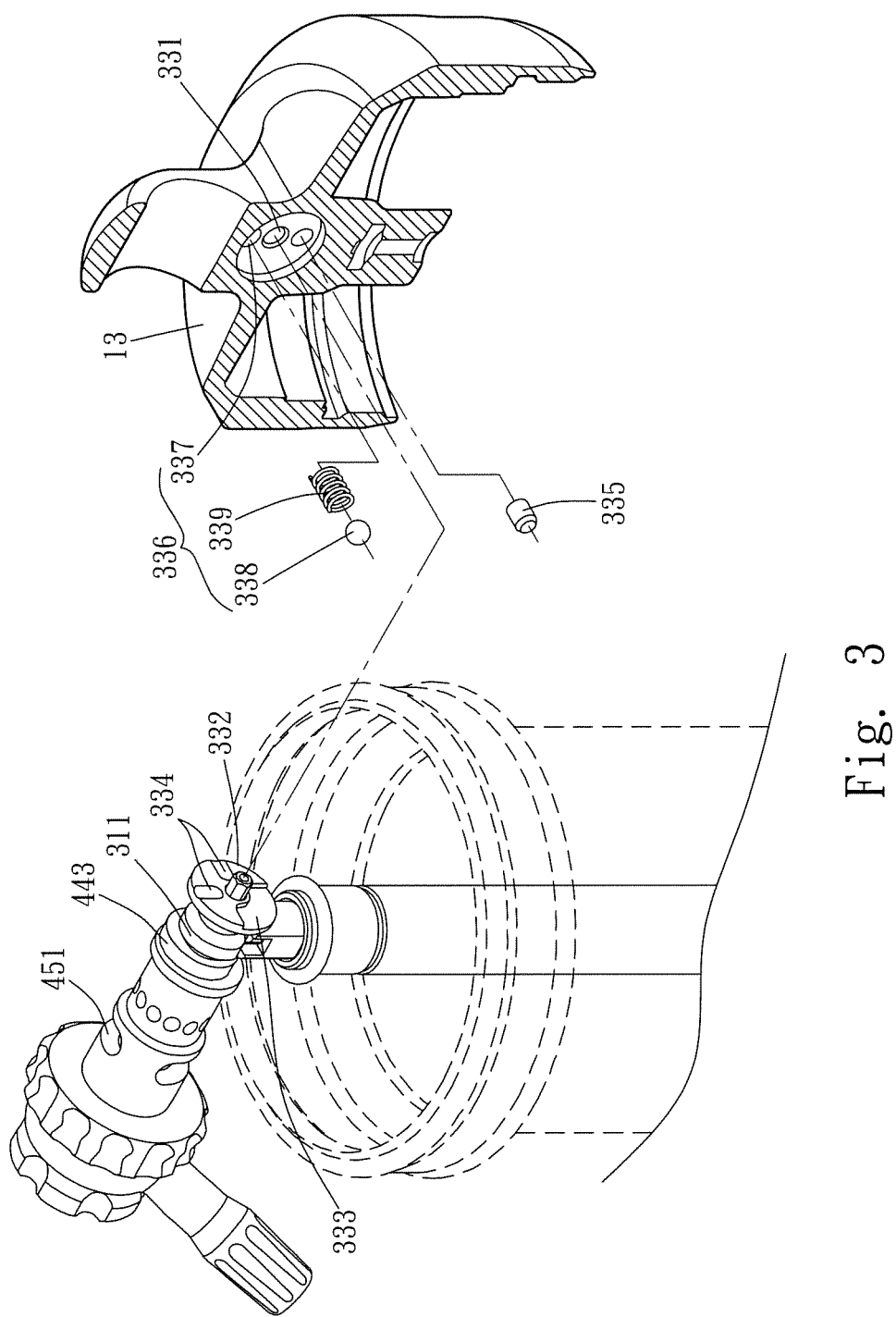
FIG. 3 is another exploded view to show the co-axial adjustable damping assembly of the present invention.
Figure 4:
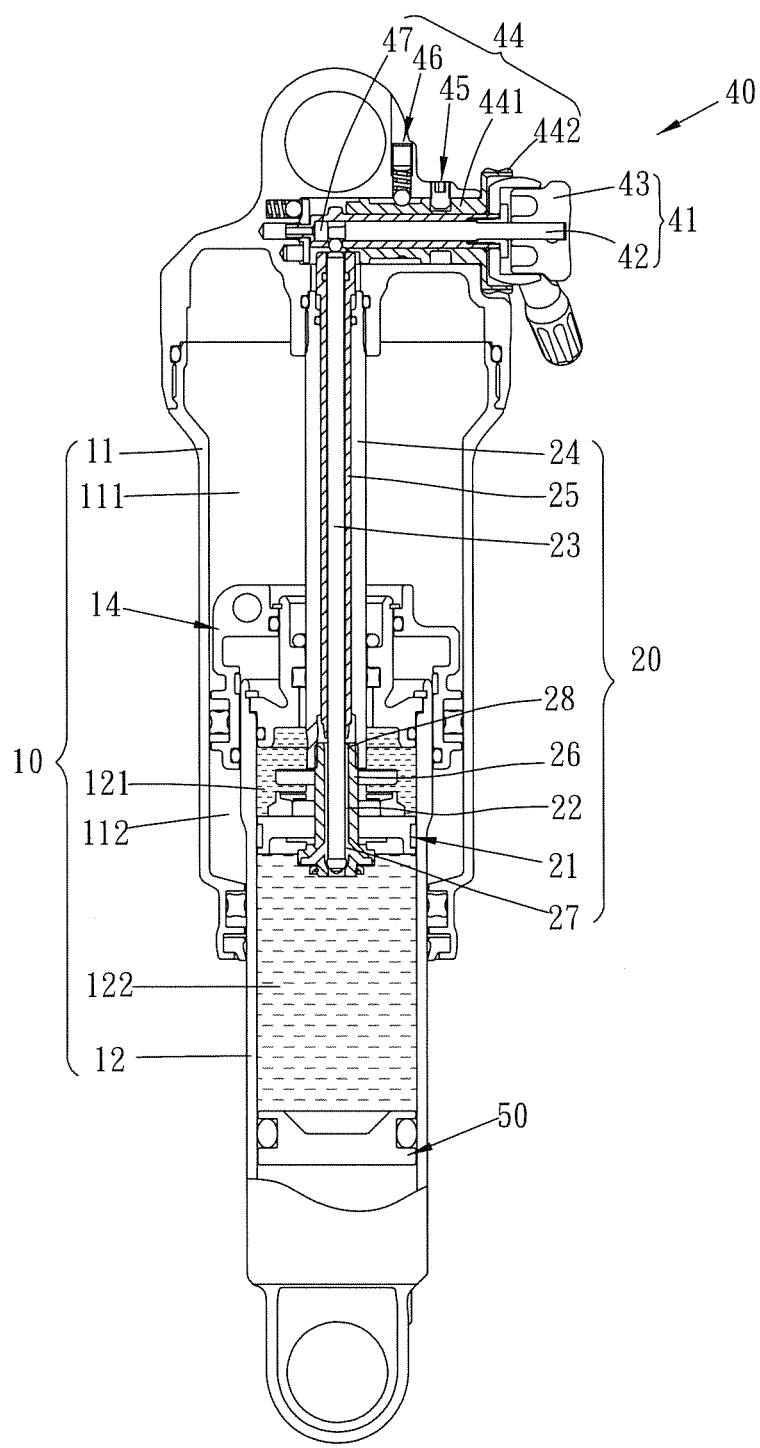
FIG. 4 is a cross sectional view of the co-axial adjustable damping assembly of the present invention.
Figure 5:
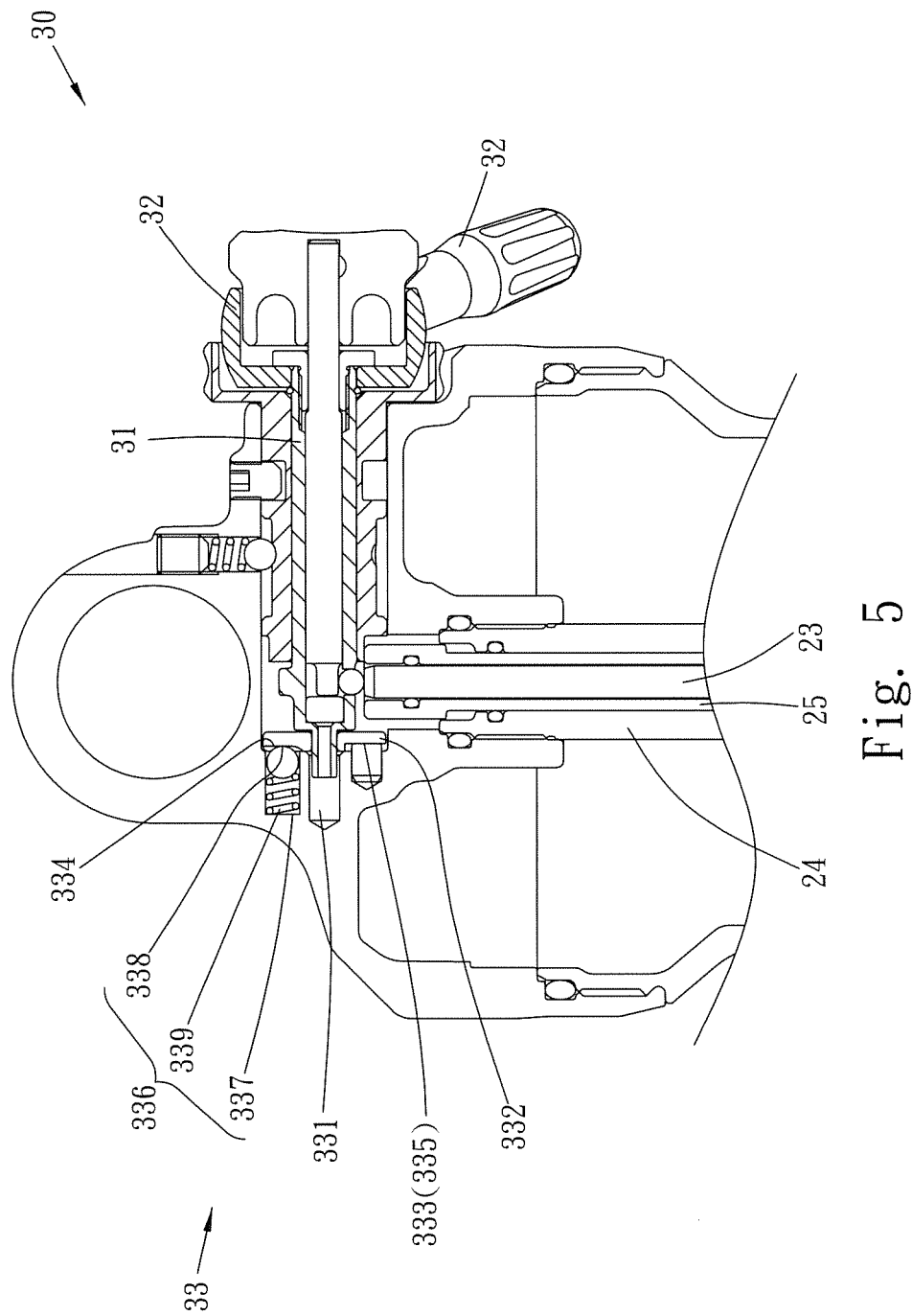
FIG. 5 shows the switch device of the co-axial adjustable damping assembly of the present invention.
Figure 6:
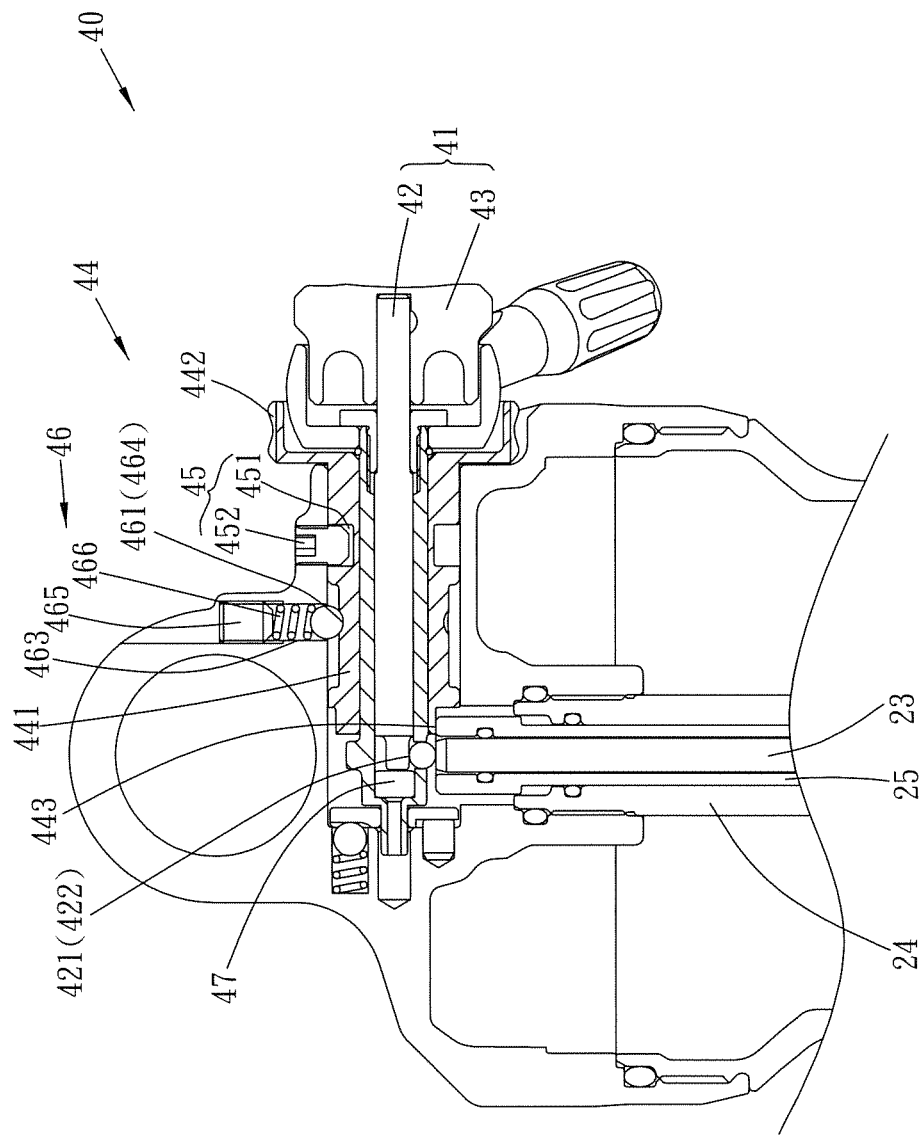
FIG. 6 shows the damping device of the co-axial adjustable damping assembly of the present invention.

Referring to FIGS. 1 to 6, the co-axial adjustable damping assembly of the present invention comprises a cylinder unit 10, a valve unit 20 in the cylinder unit 10, a switching device 30, a damping device 40 and a pressure stabilization unit 50.

The cylinder unit 10 comprises an outer case 11 and an inner case 12 which is linearly and movably inserted into the outer case 11. The outer case 11 has a cap 13 to seal one end of the outer case 11. A piston unit 14 is connected to one end of the inner case 12 and movably in contact with inside of the outer case 11. The piston unit 14 and the inner case 12 are co-movable linearly. The piston unit 14 defines the interior of the outer case 11 into a first air chamber 111 and a second air chamber 112.

The valve unit 20 is located in the center of the outer case 11 and the first end of the valve unit 20 extends through the piston unit 14 and is inserted into the inner case 12. A piston 21 is connected to the first end of the valve unit 20 and defines a first oil chamber 121 and a second oil chamber 122 in the inner case 12. Hydraulic oil is filled in the first and second oil chambers 121, 122. The valve unit 20 forms a path 22 which communicates between the first and second oil chambers 121, 122 so that the hydraulic oil passes through the path 22. A piston rod 23 extends through the inner case 12, the outer case 11, the piston unit 14 and the piston 21, and the piston rod 23 is moved linearly to open or seal the path 22. The valve unit 20 has an outer tube 24 which extends through the piston unit 14 and an inner tube 25 is inserted into the outer tube 24. The piston rod 23 is inserted in the inner tube 25. The inner tube 25 and the piston rod 23 are respectively and linearly movable in the outer tube 24. A sleeve 26 is mounted to the outer tube 24 and located at the center of the piston 21. The path 22 is defined between the outer tube 24, the inner tube 25, the piston rod 23 and the sleeve 26. The sleeve 26 extends through the piston 21 and has a first throttle recess 261 which is an inclined recess. The piston rod 23 extends through the sleeve 26 and has an inclined first throttle portion 231 which is in contact with the first throttle recess 261 when the piston rod 23 moves a distance. The first position 27 is located at the path 22 and between the first throttle portion 231 and the first throttle recess 261. The inner tube 25 has an inclined second throttle portion 251 which is located close to the sleeve 26. The sleeve 26 has an inclined second throttle recess 262 which is located corresponding to the second throttle portion 251. The second position is located at the path 22 and between the second throttle portion 251 and the second throttle recess 262.

The switching device 30 is connected to the cap 13 and has a first tube 31 which is rotatably located in the cap 13. A lever 32 is connected to one end of the first tube 31 and located outside of the cap 13. The first tube 31 is perpendicular to the lever 32. A cam part 311 is formed on the outside of the first tube 31 and located to contact the piston rod 23 to linearly move the piston rod 23 to seal and open the path 22.

The switching device 30 has an on/off positioning unit 33 which is located at the inside of the cap 13 and has a pivotal recess 331. The first tube 31 extends through the pivotal recess 331. A disk 332 is mounted to the first tube 31 and located close to the pivotal recess 331. The disk 332 has a restriction recess 333 and two positioning recesses 334, the restriction recess 333 and the positioning recesses 334 are located corresponding to the pivotal recess 331 so as to position on and off positions of the switching device 30. A positioning member 335 is connected to the cap 13 and is inserted into the restriction recess 333. A resilient positioning part 336 is connected to the cap 13 and is linearly movable in the positioning recesses 334. The resilient positioning part 336 has a space 337 and a bead 338 is located in the space 337. The bead 338 is engaged with one of the positioning recesses 334. A resilient member 339 is located in the space 337 and biased between the inside of the space 337 and the bead 338 so as to bias the bead 338 toward the positioning recesses 334.

The damping device 40 has a first damping unit 41 which has a driving rod 42 co-axially inserted into the first tube 31 and is partially exposed from the cap 13. The driving rod 42 is perpendicular to the piston rod 23. The driving rod 42 has a notch 421 located corresponding to the piston rod 23. A ball 422 made by metal and contacts the notch 421 and the piston rod 23. A knob 43 is connected to the exposed end of the driving rod 42 and partially and co-axially engaged within the lever 32. The knob 43 and the driving rod 42 are simultaneously rotated to move the piston rod 23 linearly so as to adjust the size of the path 22 at a first position 27. The knob 43 has an indication mark 431 on a face thereof so as to indicate the stage and the switching status of the path. The damping device 40 has a second damping unit 44 which has a second tube 441 co-axially and rotatably mounted to the first tube 31 and located inside the cap 13. The second tube 441 has one end exposed from the cap 13 and an adjustment knob 442 is connected to the end. The adjustment knob 442 is co-axially mounted to the lever 32. The second tube 441 is perpendicular to the inner tube 25. The second tube 441 has a adjustment cam 443 connected thereto which is located to contact the inner tube 25. The inner tube 25 moves linearly when the second tube 441 is rotated so as to adjust the size of the path 22 at a second position 28.

The second damping unit 44 has a positioning unit 45 which has a positioning notch 451 defined in the outside of the second tube 441. A pin 452 extends through the cap 13 and is inserted into the positioning notch 451. The second damping unit 44 has a stage positioning unit 46 which has multiple dimples 461 defined annularly in the outside of the second tube 441. A resilient positioning unit 462 is connected to the cap 13 and is engaged with one of the dimples 461. The resilient positioning unit 462 is linearly movable between the cap 13 and the second tube 441. The resilient positioning unit 462 comprises a through hole 463 defined in the cap 13 and a bead 464 is located in the through hole 463. The bead 464 is engaged with one of the dimples 461. A locking member 465 is threadedly to the through hole 463 and located close to outer periphery of the cap 13. A resilient member 466 is located between the bead 464 and the locking member 465 to bias the bead 464 toward the dimples 461. The first damping unit 41 has a magnetic member 47 which contacts the driving rod 42, the bead 422 is attracted to the notch 421 by the magnetic member 47.

The pressure stabilization unit 50 contacts an inside of the inner case 12 so as to define two rooms in the second oil chamber 122. The pressure stabilization unit 50 moves linearly according to change of pressure in the rooms.

It is noted that the notch 421 is integrally formed with the driving rod 42, and the cam part 311 is integrally formed with the first tube 31, and the adjustment cam 443, the dimples 461 and the positioning notch 451 are integrally formed with the second tube 441.

When assembling, the piston rod 23 and the sleeve 26 are located at the center of the piston 21, and the inner tube 25 and the outer tube 24 are mounted to the piston rod 23. The piston unit 14 is connected to one end of the inner case 12. The inner tube 25, the outer tube 24 and the piston rod 23 extend the center of the piston unit 14. The piston 21 is inserted in through the inner case 12 so as to define the first and second oil chambers 121, 122. The outer case 11 is mounted to the piston unit 14 and the inner case 12 so that the piston unit 14 defines the interior of the outer case 11 into the first and second air chambers 111, 112. The magnetic member 47 and the driving rod 42 extend through the first tube 31, and the magnetic member 47 contacts the driving rod 42. The driving rod 42 and the first tube 31 are inserted in the second tube 441. Because the bead 422 is made by metal, it is attracted by the magnetic member 47 and contacts the notch 421, while the bead 422 is partially exposed from the first tube 31. The positioning member 335 is located in the restriction recess 333, and the resilient member 339 and the bead 338 are located in the space 337. The combination of the driving rod 42, the first tube 31 and the second tube 441 then extends through the disk 332 and is inserted in the pivotal recess 331 of the cap 13. The bead 338 contacts the positioning recess 334 and the positioning member 335 is located in the restriction recess 333. The other end of the combination of the driving rod 42, the first tube 31 and the second tube 441 then is exposed from the cap 13. The adjustment knob 442, the lever 32, the knob 43 are co-axially connected to the combination. The adjustment knob 442 and the second tube 442 can be co-rotated, and the lever 32 and the first tube 31 are co-rotated. The knob 43 and the driving rod 42 are co-rotated. The pin 452 extends through the cap 13 and is engaged with the positioning notch 451 to position the second tube 441 to the cap 13. The bead 464, the resilient member 466 and the locking member 465 are inserted in the through hole 463 in sequence. The bead 464 is engaged with one of the dimples 461 to provide multiple-stage positioning function. The cap 13 is then connected to the outer case 11 to close the open end of the outer case 11. The outer tube 24 is secured to the inside of the cap 13 and the piston rod 23 contacts the exposed bead 422. The outer diameter of the second tube 441 contacts the end of the inner tube 25.

Figure 7:
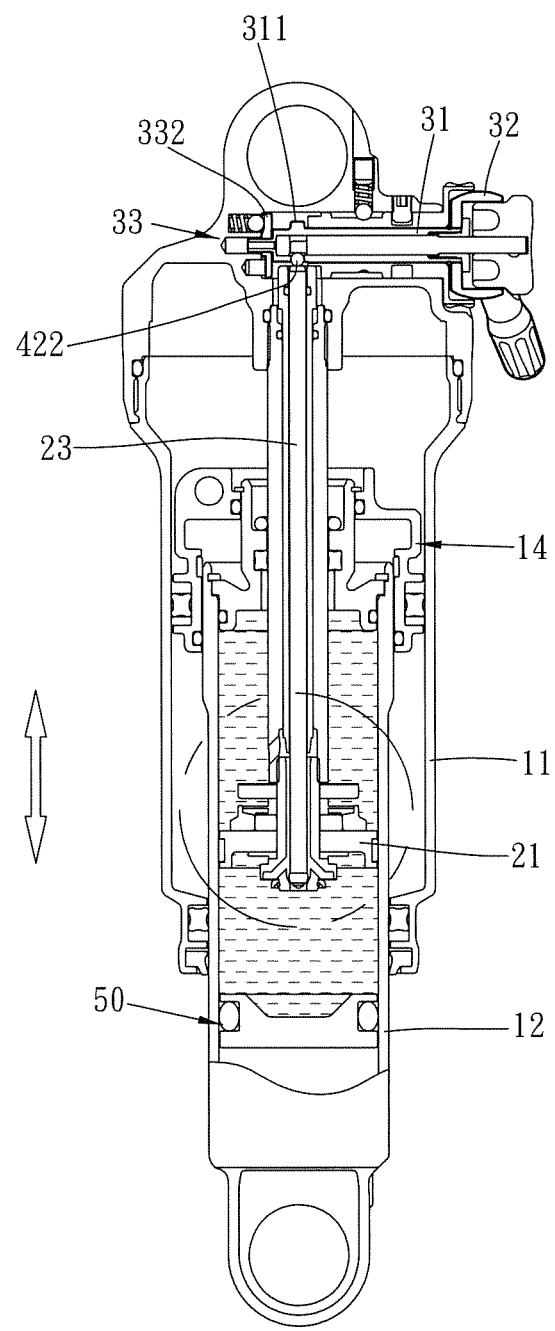
FIG. 7 shows that the co-axial adjustable damping assembly of the present invention is in activated status.
Figure 8:
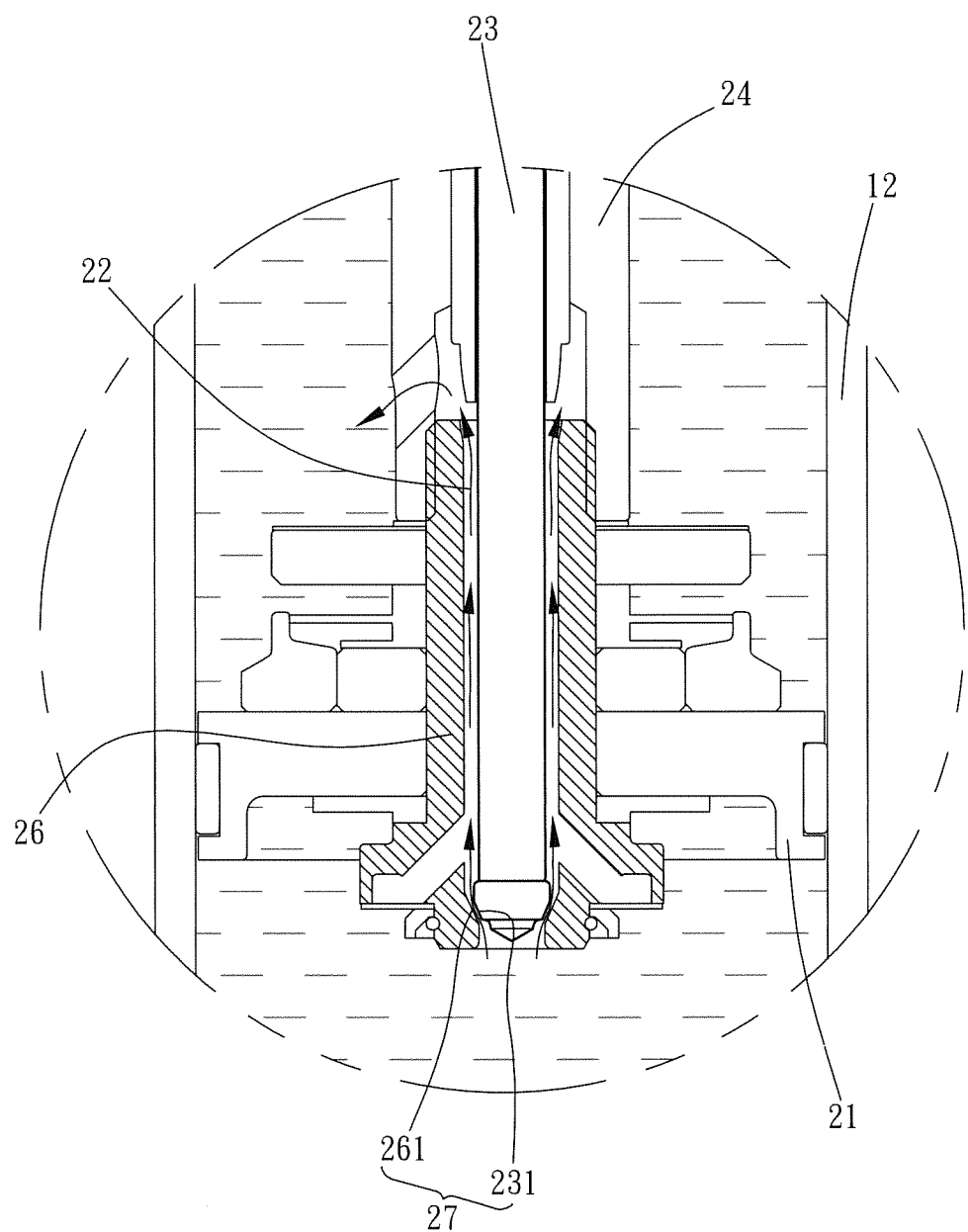
FIG. 8 is another view to show that the co-axial adjustable damping assembly of the present invention is in activated status.
Figure 9:
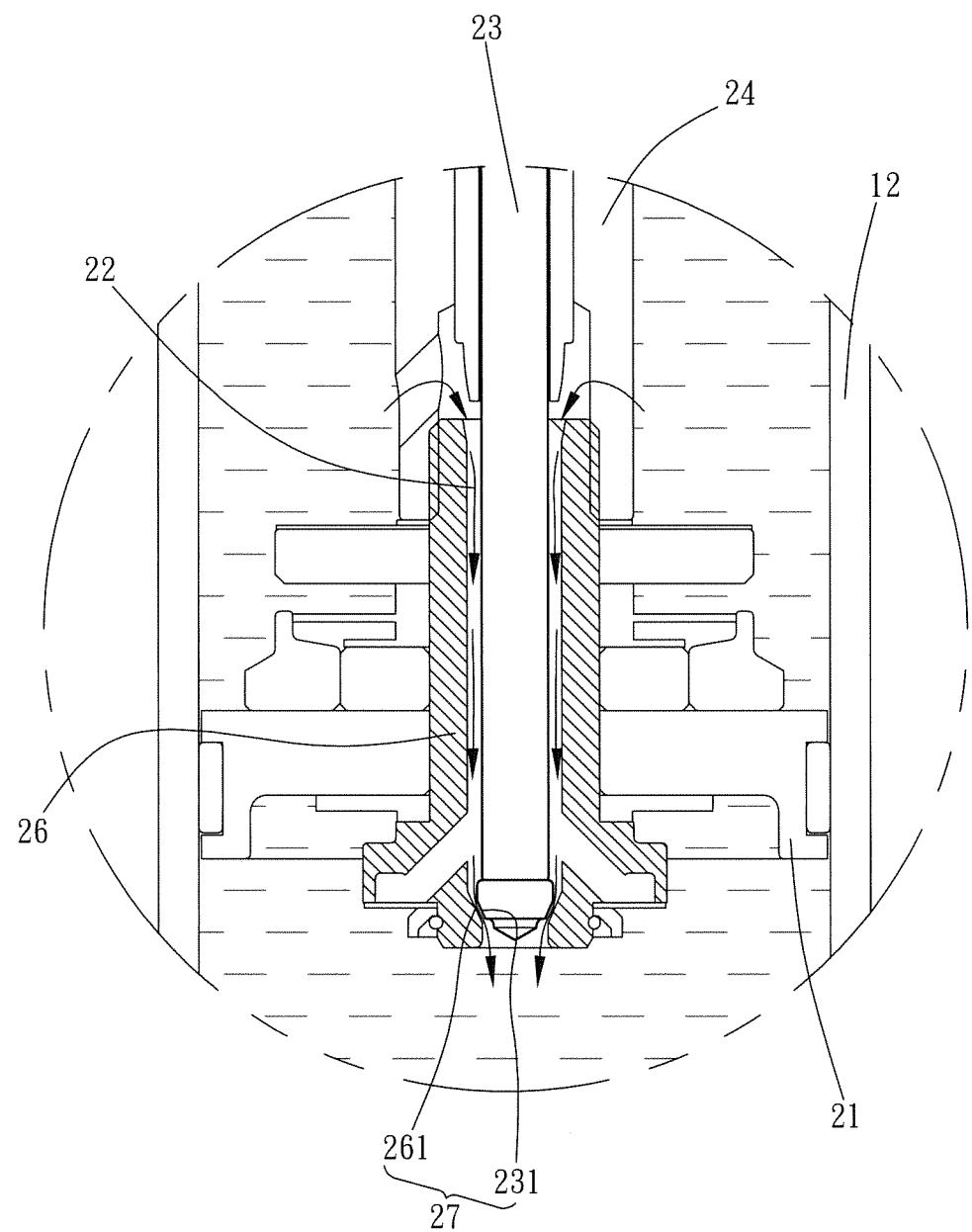
FIG. 9 is yet another view to show that the co-axial adjustable damping assembly of the present invention is in activated status.
Figure 10:
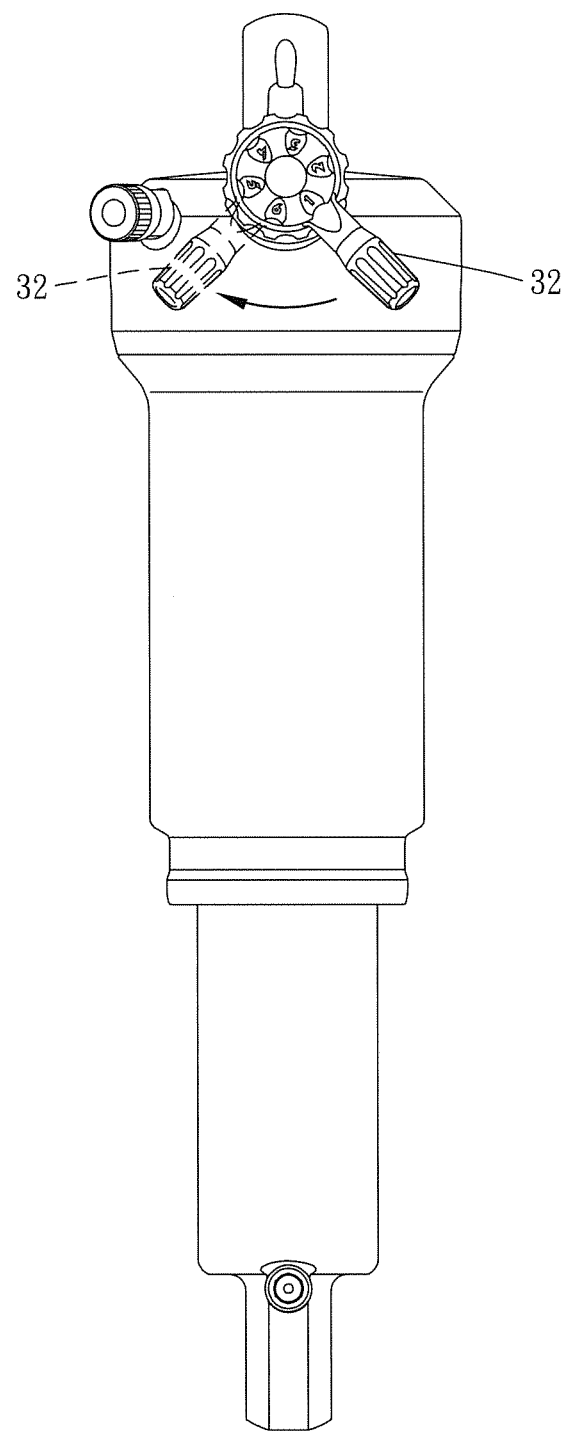
FIG. 10 shows that the co-axial adjustable damping assembly of the present invention is in locked status.
Figure 11:
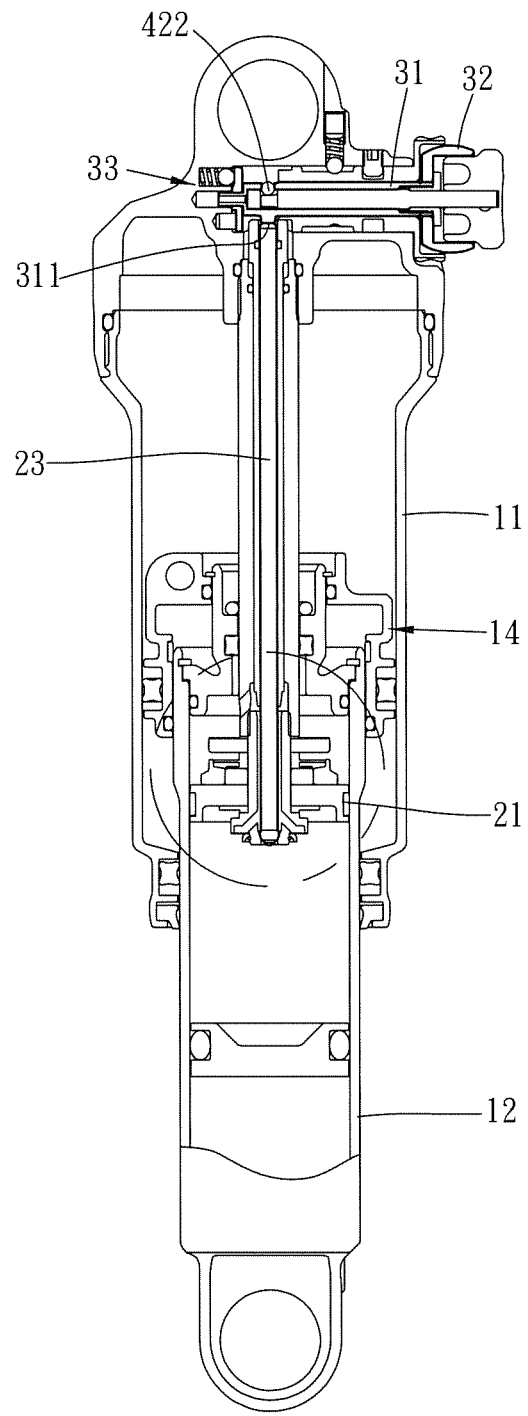
FIG. 11 is another view to show that the co-axial adjustable damping assembly of the present invention is in locked status.
Figure 12:
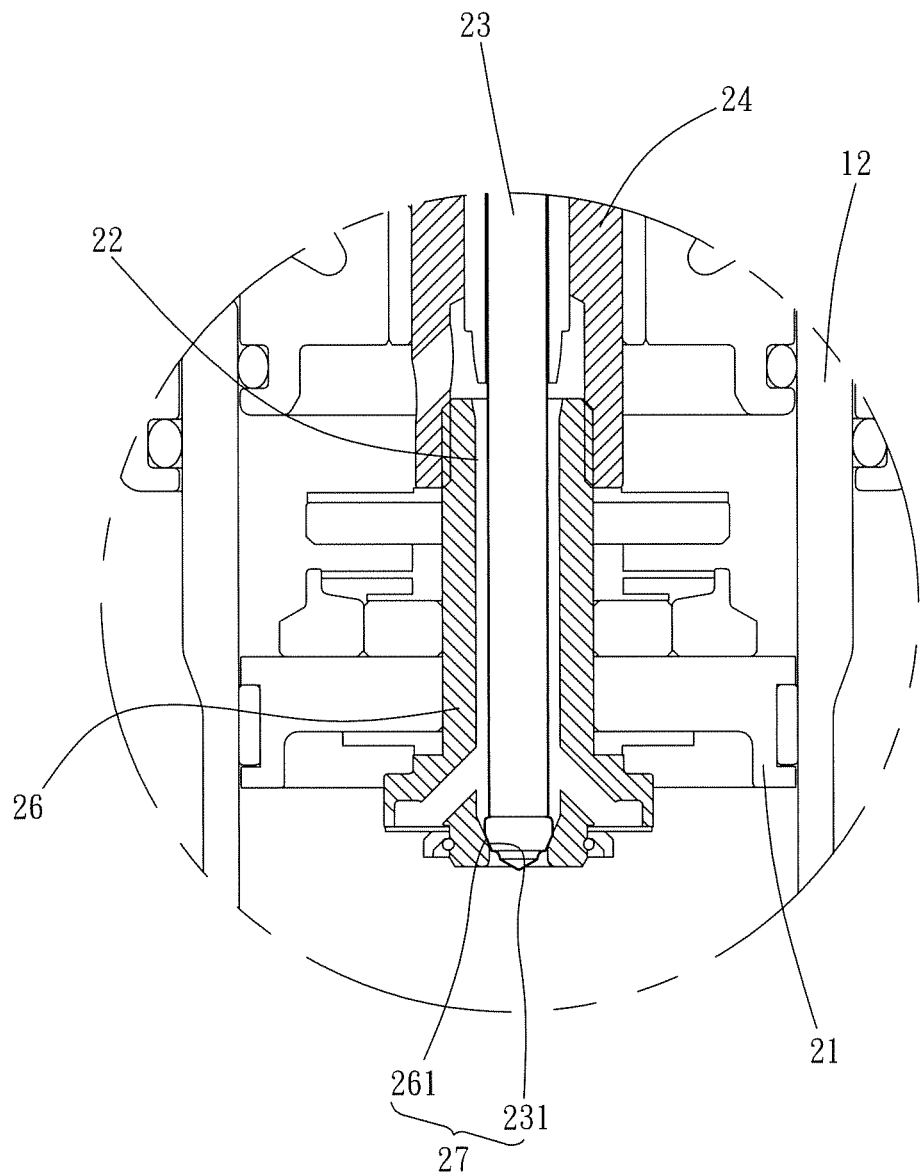
FIG. 12 is yet another view to show that the co-axial adjustable damping assembly of the present invention is in locked status.
Figure 13:
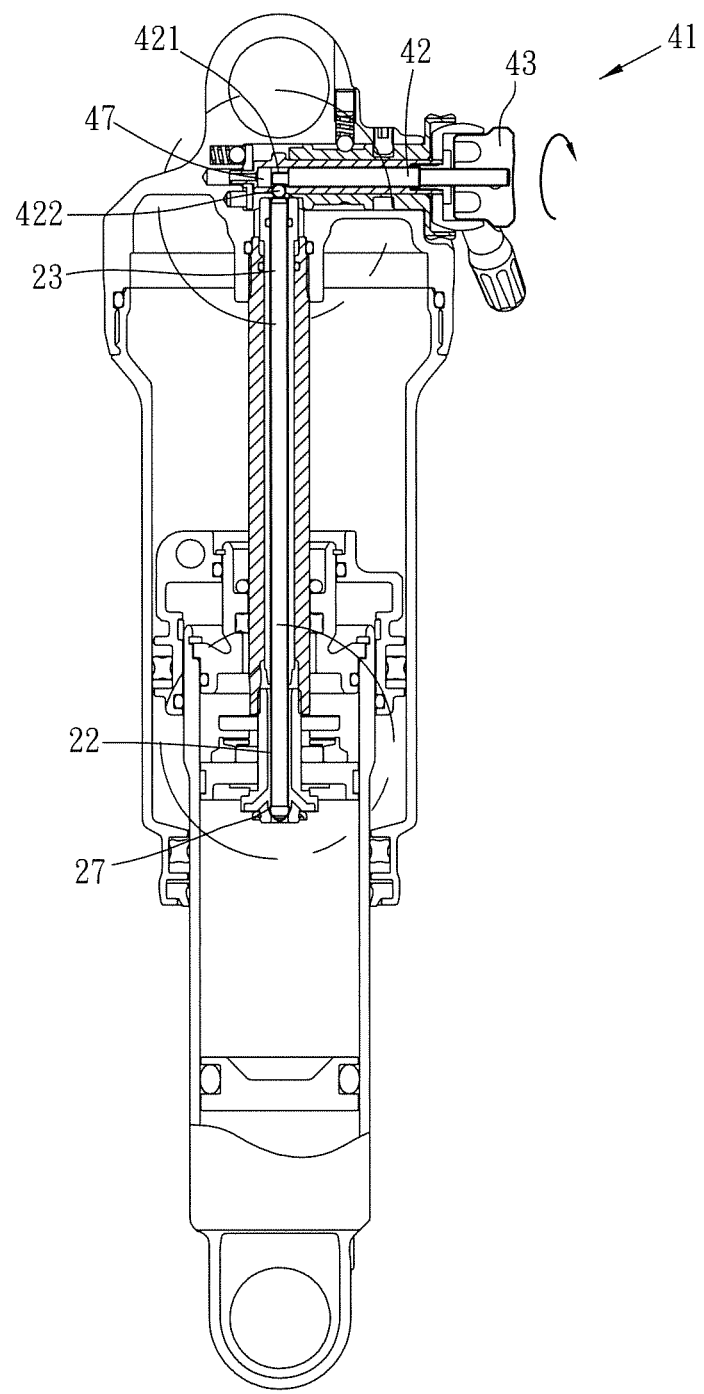
FIG. 13 shows that the co-axial adjustable damping assembly of the present invention is in compression status.
Figure 14:
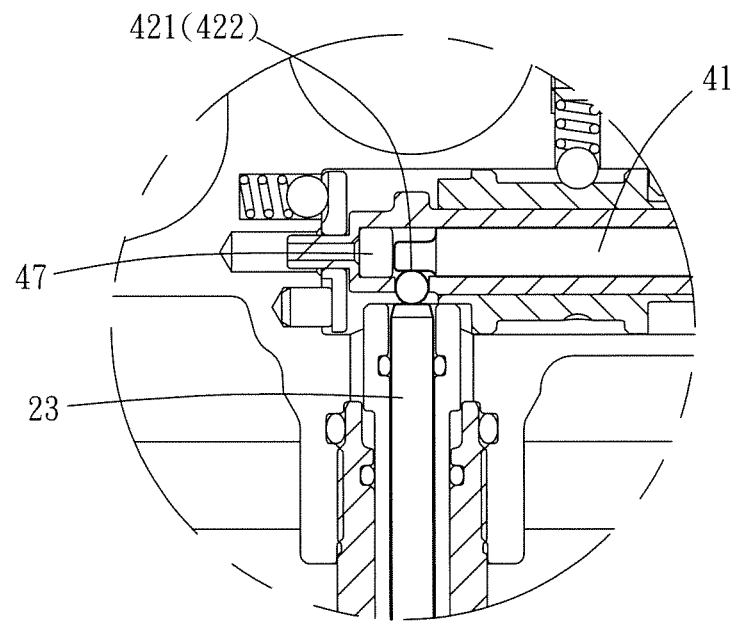
FIG. 14 is another view to show that the co-axial adjustable damping assembly of the present invention is in compression status.
Figure 15:
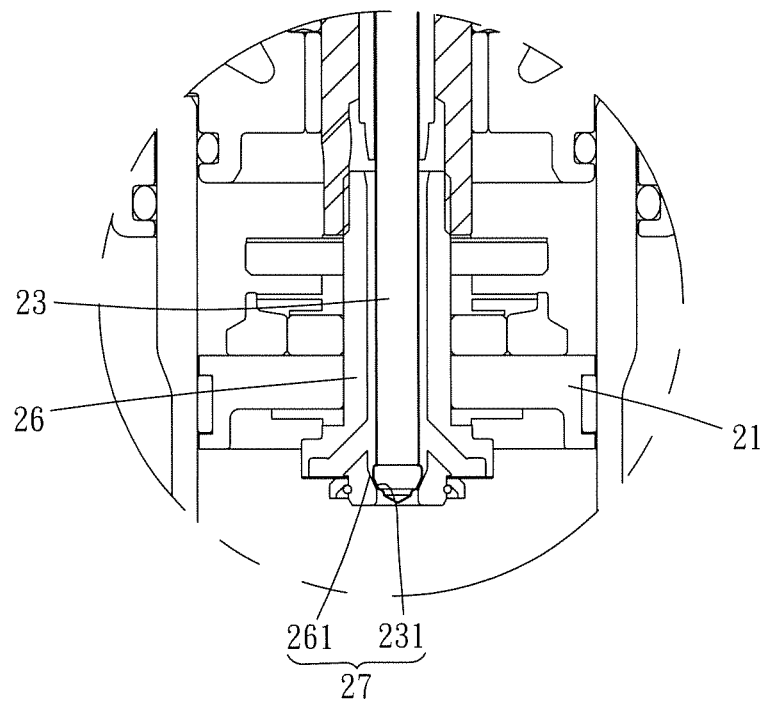
FIG. 15 is another view to show that the co-axial adjustable damping assembly of the present invention is in compression status.
Figure 16:
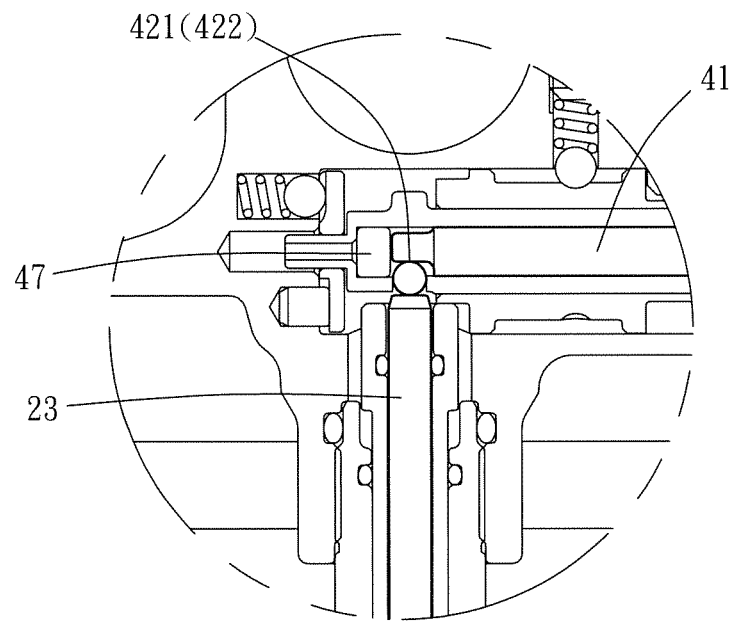
FIG. 16 is another view to show that the co-axial adjustable damping assembly of the present invention is in compression status.
Figure 17:
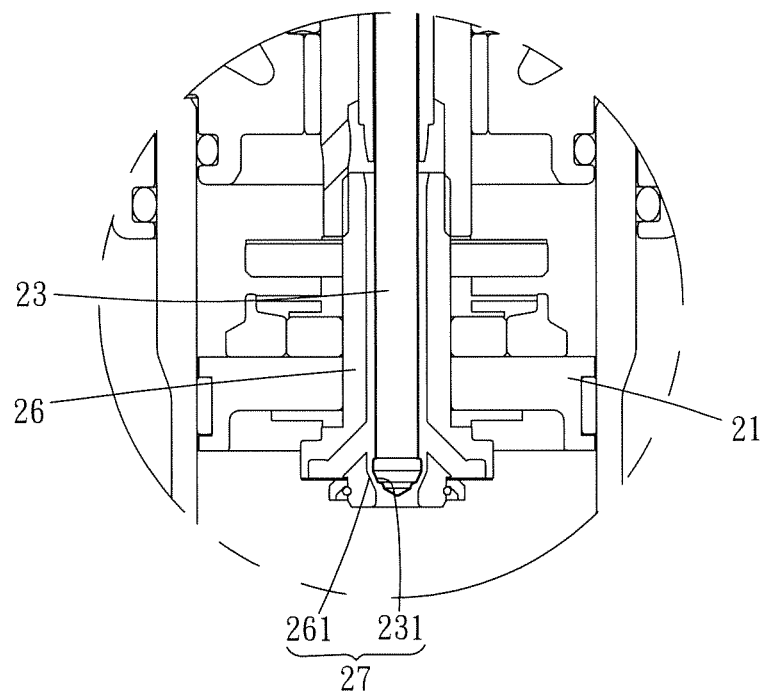
FIG. 17 is another view to show that the co-axial adjustable damping assembly of the present invention is in compression status.
Figure 18:
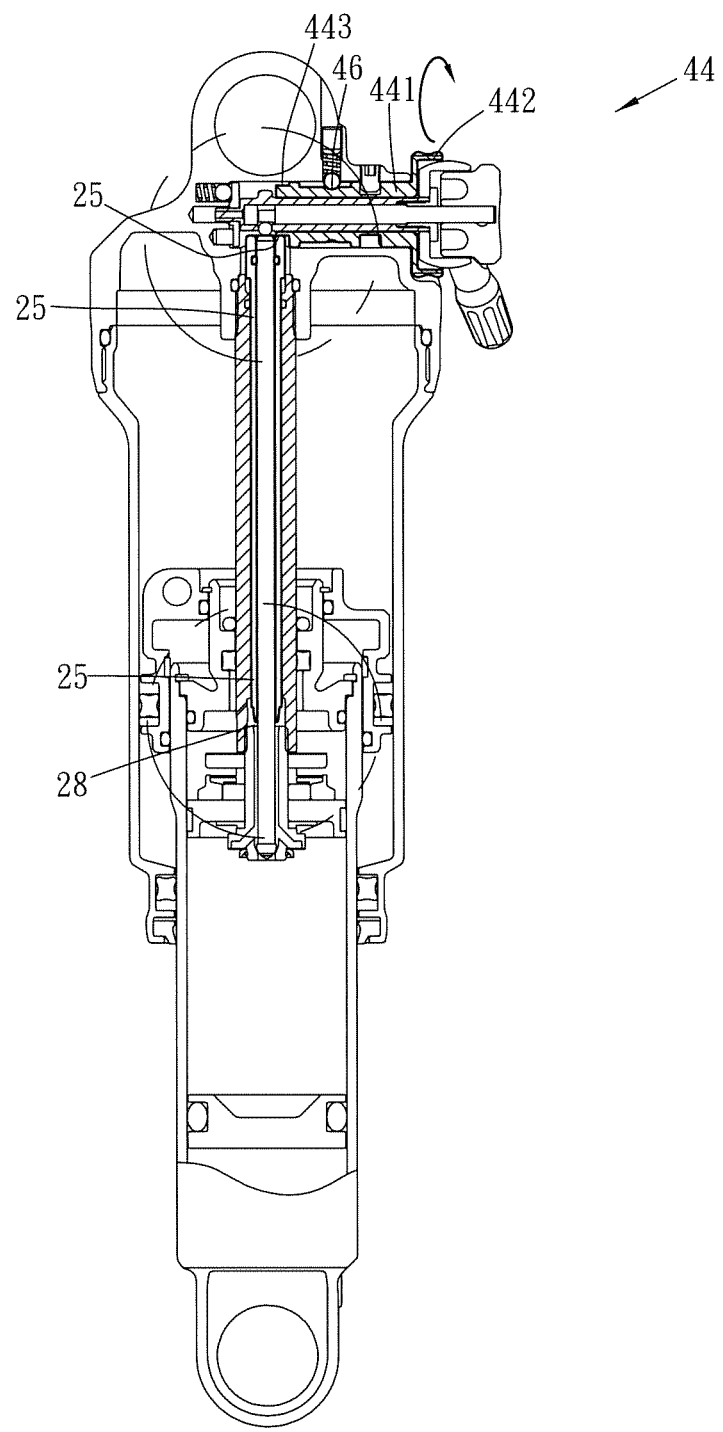
FIG. 18 shows that the co-axial adjustable damping assembly of the present invention is in extension status.
Figure 19:
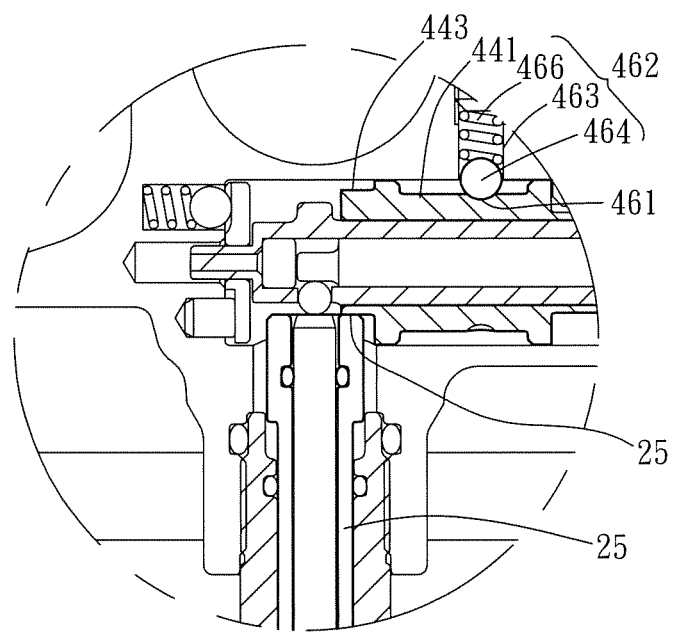
FIG. 19 is another view to show that the co-axial adjustable damping assembly of the present invention is in extension status.
Figure 20:
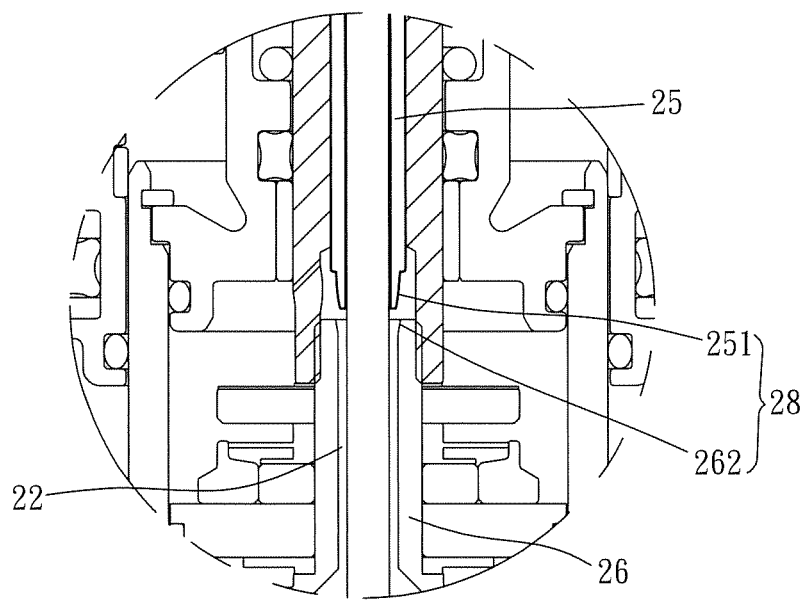
FIG. 20 is another view to show that the co-axial adjustable damping assembly of the present invention is in extension status.
Figure 21:
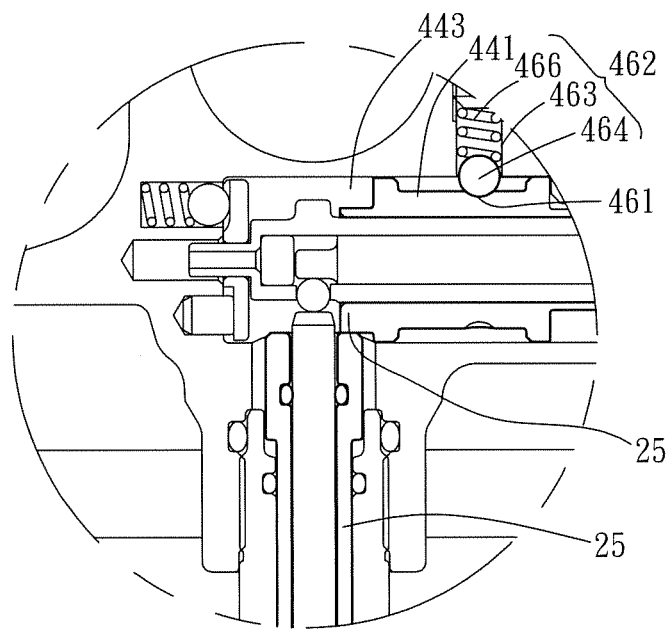
FIG. 21 is another view to show that the co-axial adjustable damping assembly of the present invention is in extension status.
Figure 22:
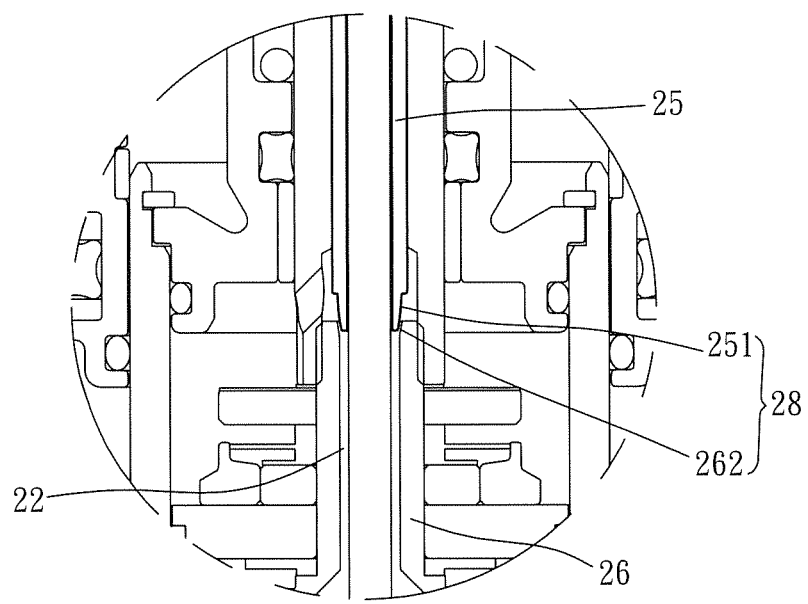
FIG. 22 is another view to show that the co-axial adjustable damping assembly of the present invention is in extension status.

As shown in FIGS. 7 to 9, when the lever 32 is pivoted to the ON position, the ball 422 is partially located in the first tube 31 and contacts the notch 421. The piston rod 23 is opened at the first position 27 and a distance is formed between the first throttle recess 261 and the first throttle portion 231, so that the hydraulic oil flows between the first and second oil chambers 121, 122 via the path 22 and the outer tube 24 and the sleeve 26. The inner case 12 is linearly movable in the outer case 11 so as to provide damping function.

As shown in FIGS. 1 to 12, when the lever 32 is pivoted to OFF position, the roller 422 is magnetically attracted and contacts the notch 421 so that the lever 32 is co-rotated with the driving rod 42, the first tube 31 and the disk 332 until the portion with the maximum diameter of the cam part 311 contacts the piston rod 23. This drives the piston rod 23 to move linearly so that the first position is closed. This means the first throttle recess 261 and the first throttle portion 231 are in contact with each other, so that the hydraulic oil cannot flow through the path 22, the outer tube 24, the sleeve 26, the first oil chamber 121 and the second oil chamber 122. The inner case 122 cannot move in the outer case 121, and the damping assembly is locked.

As shown in FIGS. 13 to 17, when adjusting the damping force, the lever 32 is pivoted to the ON position and the knob 43 is rotated to co-rotate the driving rod 42 and the notch 421. Because the notch 421 is cam-shaped notch and has various diameters so that the ball 422 is driven by the inside of the notch 421 to drive the piston rod 23 to move linearly so as to adjust the size of the path at the first position 27, which is the distance between the first throttle recess 261 and the first throttle portion 231. This adjustment adjusts the size from the second oil chamber 122 to the first oil chamber 121.

When the distance of the first position 27 becomes longer, the velocity of the hydraulic oil from the second oil chamber 122 to the path 22 is increased, then the linear velocity of the inner case 12 moves into the outer case 11 is increased, so that the compression velocity is increased. When the distance of the first position 27 becomes shorter, the velocity of the hydraulic oil from the second oil chamber 122 to the path 22 is decreased, then the linear velocity of the inner case 12 moves into the outer case 11 is decreased, so that the compression velocity is decreased.

As shown in FIGS. 18 to 22, the adjustment to the returning is disclosed. The lever 32 is pivoted to ON position and the adjustment knob 442 is rotated so that the second tube 441 and the adjustment cam 443 are co-rotated. The inner tube 25 is driven by the various diameters of the adjustment cam 443 to move the inner tube 25 linearly so as to adjust the size of the second position 28, which is the distance between the second throttle recess 262 and the second throttle portion 251. This adjustment adjusts the size from the first oil chamber 121 to the second oil chamber 122.

When the distance of the second position 28 becomes longer, the velocity of the hydraulic oil from the first oil chamber 121 to the path 22 is increased, then the linear velocity of the inner case 12 moves away from the outer case 11 is increased, so that the returning velocity is increased. When the distance of the second position 28 becomes shorter, the velocity of the hydraulic oil from the first oil chamber 121 to the path 22 is decreased, then the linear velocity of the inner case 12 moves away from the outer case 11 is decreased, so that the returning velocity is decreased.

The inner tube 25 is automatically returned to the initial position because there is a hydraulic oil pressure in the path 22, so that the inner tube 25 constantly contacts the adjustment cam 443. When inner tube 25 contacts the portion where the diameter of the adjustment cam 443 becomes larger, the inner tube 25 is gradually moved toward the second position 28. When inner tube 25 contacts the portion where the diameter of the adjustment cam 443 becomes smaller, the inner tube 25 is gradually moved toward the adjustment cam 443 due to the hydraulic oil pressure of the second position 28.

The switching device 30 provides the disk 332 and the first tube 31 to be co-rotated and positioned by the on/off positioning unit 33 wherein the positioning member 335 is located in the restriction recess 333. The resilient positioning part 336 and the positioning recess 334 provide the positioning feature for the two-stage switching device 30. When the resilient positioning part 336 is engaged with the positioning recess 334, the bead 338 suddenly hits the positioning recess 334 by the resilient member 339, so that the user can feel the impact and vibration and is acknowledged that the switch action is completed so as to stop the action. In the same time, the switching device 30 provides a quick opening or locking feature.

The notch 421, the cam part 311 and the adjustment cam 443 are cam-shaped parts so that when the driving rod 42, the first tube 31 and the second tube 441 are rotated, the diameters of the notch 421, the cam part 311 and the adjustment cam 443 are changed so as to drive the piston rod 23 and the inner tube 25 to move linearly, and further open or close the first position 27 or respectively adjust the first and second positions 27, 28 to achieve the purposes of damping force adjustment and switching feature. The cam-shaped part needs only to be rotated in one revolution, all of the adjustments can be done so that the travel distance for the knob 43 and the driving rod 42 is shorter, and the linear distance for the driving rod 23, the first tube 31 and the second tube 441 is also shorter. The present invention has higher sensitivity when compared with the conventional damping assemblies.

The travel for the damping is the sum of the linear movement of compression stroke of the inner case 12 that is moved into the outer case 11, plus the linear movement of returning stroke of the inner case 12 that is moved in the direction away from the outer case 11. When using the first and second damping units 41, 44 to adjust the compression and returning strokes, if the distance at the first position 27 is decreased and the distance at the second position 28 is increased, when the damping assembly is applied by an impact, the velocity of the compression stroke of the inner case 12 is slower and the velocity of the returning stroke of the inner case 12 is faster. If the distance at the first position 27 is decreased and the distance at the second position 28 is increased, when the damping assembly is applied by an impact, the velocity of the compression stroke of the inner case 12 is slower and the velocity of the returning stroke of the inner case 12 is faster. In other words, the present invention can adjust the compression and returning strokes of the first and second damping units 41, 44 according the practical needs.

The switching device 30 and the damping device 40 are adjusted by co-axial adjustment mechanism, cooperated with the knob 43 is located in the lever 32 so that the user's hand can switch the damping assembly at the same position without moving hand to different positions.

It is noted that the pressure stabilization unit 50 contacts the inside of the inner case 12 and is linearly moveable in the second oil chamber 122 so as to reduce the vibration when the hydraulic oil flows fast such that the inner case 12 can be smoothly moved. Besides, pin 452 of the positioning unit 45 extends through cap 13 from outside of the cap 13 and is inserted in the positioning notch 451 of the second tube 441 so that the second tube 441 is connected to the cap 13 and rotatable relative to the cap 13, and does not separate from the cap 13. The stage positioning unit 46 has multiple dimples 461 on the second tube 441, and the bead 464 can be engaged with one of the dimples 461 when adjusting the second damping unit 44 by rotating the adjustment knob 442 and the second tube 441. The bead 338 suddenly hits the positioning recess 334 by the resilient member 339, so that the user can feel the impact and vibration and is acknowledged that the switch action is completed so as to stop the action.

While we have shown and described the embodiment in accordance with the present invention, it should be clear to those skilled in the art that further embodiments may be made without departing from the scope of the present invention.

What is claimed is:

1. An co-axial adjustable damping assembly comprising:
a cylinder unit (10) having an outer case (11) and an inner case (12) which is linearly and movably inserted into the outer case (11), the outer case (11) having a cap (13) to seal one end of the outer case (11), a piston unit (14) connected to one end of the inner case (12) and the piston unit (14) being movably in contact with inside of the outer case (11);
a valve unit (20) having a first end extending through the piston unit (14) and inserted into the inner case (12), a piston (21) connected to the first end of the valve unit (20) and defining a first oil chamber (121) and a second oil chamber (122) in the inner case (12), a path (22) communicating between the first and second oil chambers (121, 122), a piston rod (23) extending through the inner case (12), the outer case (11), the piston unit (14) and the piston (21), the piston rod (23) being moved linearly;

a switching device (30) connected to the cap (13) and having a first tube (31) which is rotatably located in the cap (13), a lever (32) connected to one end of the first tube (31) and located outside of the cap (13), a cam part (311) formed on an outside of the first tube (31) and located corresponding to the piston rod (23), the cam part (311) contacting the piston rod (23) to linearly move the piston rod (23) to seal and open the path (22);

a damping device (40) having a first damping unit (41) which has a driving rod (42) co-axially inserted into the first tube (31) and partially exposed from the cap (13), the driving rod (42) having a notch (421) located corresponding to the piston rod (23), a ball (422) contacting the notch (421) and the piston rod (23), a knob (43) connected to an exposed end of the driving rod (42) and partially and co-axially engaged within the lever (32), the knob (43) and the driving rod (42) being simultaneously rotated to move the piston rod (23) linearly so as to adjust the path (22) at a first position (27);

wherein the switching device (30) has an on/off positioning unit (33) which is located at an inside of the cap (13) and has a pivotal recess (331) in which the first tube (31) is inserted, the pivotal recess (331) is co-axial with the first tube (31), a disk (332) is mounted to the first tube (31) and located close to the pivotal recess (331), the disk (332) has a restriction recess (333) and at least one positioning recess (334), the restriction recess (333) and the at least one positioning recess (334) are located corresponding to the pivotal recess (331) so as to position the switching device (30), a positioning member (335) is connected to the cap (13) and is inserted into the restriction recess (333), a resilient positioning part (336) is connected to the cap (13) and is linearly movable in the at least one positioning recess (334).

2. The assembly as claimed in claim 1, wherein the valve unit (20) has an outer tube (24) which extends through the piston unit (14) and an inner tube (25) is inserted into the outer tube (24), the piston rod (23) is inserted in the inner tube (25), the inner tube (25) and the piston rod (23) are respectively and linearly movable in the outer tube (24), a sleeve (26) is mounted to the outer tube (24) and located at a center of the piston (21), the path (22) is defined between the outer tube (24), the inner tube (25), the piston rod (23) and the sleeve (26).

3. The assembly as claimed in claim 2, wherein the sleeve (26) has a first throttle recess (261) which is an inclined recess, the piston rod (23) extends through the sleeve (26) and has an inclined first throttle portion (231) which is in contact with the first throttle recess (261) when the piston rod (23) moves a distance, the first position (27) is located between the first throttle portion (231) and the first throttle recess (261).

4. The assembly as claimed in claim 2, wherein the damping device (40) has a second damping unit (44) which has a second tube (441) co-axially and rotatably mounted to the first tube (31) and located inside the cap (13), the second tube (441) has one end exposed from the cap (13) and an adjustment knob (442) is connected to the end, the adjustment knob (442) is co-axially mounted to the lever (32), the second tube (441) has a adjustment cam (443) connected thereto which is located to contact the inner tube (25), the inner tube (25) moves linearly when the second tube (441) is rotated so as to adjust the path (22) at a second position (28).

5. The assembly as claimed in claim 4, wherein the inner tube (25) has an inclined second throttle portion (251) which is located close to the sleeve (26), the sleeve (26) has an inclined second throttle recess (262) which is located corresponding to the second throttle portion (251), the second position is located between the second throttle portion (251) and the second throttle recess (262).

6. The assembly as claimed in claim 4, wherein the second damping unit (44) has a positioning unit (45) which has a positioning notch (451) defined in an outside of the second tube (441), a pin (452) extends through the cap (13) and is inserted into the positioning notch (451).

7. The assembly as claimed in claim 4, wherein the second damping unit (44) has a stage positioning unit (46) which has multiple dimples (461) defined annularly in an outside of the second tube (441), a resilient positioning unit (462) extends through the cap (13) and is engaged with one of the dimples (461), the resilient positioning unit (462) is linearly movable between the cap (13) and the second tube (441).

8. The assembly as claimed in claim 7, wherein the resilient positioning unit (462) comprises a through hole (463) defined in the cap (13) and a bead (464) located in the through hole (463), the bead (464) is engaged with one of the dimples (461), a locking member (465) is threadedly to the through hole (463) and located close to outer periphery of the cap (13), a resilient member (466) located between the bead (464) and the locking member (465) to bias the bead (464) toward the dimples (461).

9. The assembly as claimed in claim 1, wherein the resilient positioning part (336) has a space (337) and a bead (338) is located in the space (337), the bead (338) is engaged with the at least one positioning recess (334), a resilient member (339) is located in the space (337) and biased between an inside of the space (337) and the bead (338) so as to bias the bead (338) toward the at least one positioning recess (334).

10. The assembly as claimed in claim 1, wherein the second oil chamber (122) has a pressure stabilization unit (50) which contacts an inside of the inner case (12) so as to define two rooms in the second oil chamber (122), the pressure stabilization unit (50) moves linearly according to change of pressure in the rooms.

11. The assembly as claimed in claim 1, wherein the knob (43) has an indication mark (431) on a face thereof.

12. The assembly as claimed in claim 1, wherein the bead (422) is made by metal and the first damping unit (41) has a magnetic member (47) which contacts the driving rod (42), the bead (422) is attracted to the notch (421).

13. The assembly as claimed in claim 1, wherein the piston unit (14) defines an interior of the outer case (11) into a first air chamber (111) and a second air chamber (112).

\* \* \* \* \*